US010043199B2

(12) United States Patent
Hu

(10) Patent No.: US 10,043,199 B2
(45) Date of Patent: Aug. 7, 2018

(54) METHOD, DEVICE AND SYSTEM FOR PUBLISHING MERCHANDISE INFORMATION

(71) Applicant: Alibaba Group Holding Limited, George Town, KY (US)

(72) Inventor: Yuan Hu, Hangzhou (CN)

(73) Assignee: Alibaba Group Holding Limited (KY)

( * ) Notice: Subject to any disclaimer, the term of this patent is extended or adjusted under 35 U.S.C. 154(b) by 578 days.

(21) Appl. No.: 14/165,344

(22) Filed: Jan. 27, 2014

(65) Prior Publication Data

US 2014/0214559 A1 Jul. 31, 2014

(30) Foreign Application Priority Data

Jan. 30, 2013 (CN) .......................... 2013 1 0035032

(51) Int. Cl.
  *G06Q 30/00* (2012.01)
  *G06Q 30/02* (2012.01)
(52) U.S. Cl.
  CPC ................ *G06Q 30/0277* (2013.01)
(58) Field of Classification Search
  USPC ...................................... 705/26.1
  See application file for complete search history.

(56) References Cited

U.S. PATENT DOCUMENTS

| | | | |
|---|---|---|---|
| 5,918,214 A | 6/1999 | Perkowski | |
| 6,154,738 A * | 11/2000 | Call | G06Q 20/201 |
| | | | 705/20 |
| 6,175,841 B1 | 1/2001 | Loiacono | |
| 6,499,016 B1 | 12/2002 | Anderson | |
| 7,043,472 B2 | 5/2006 | Aridor et al. | |

(Continued)

FOREIGN PATENT DOCUMENTS

| | | |
|---|---|---|
| CN | 1890659 | 1/2007 |
| CN | 101124594 | 2/2008 |

(Continued)

OTHER PUBLICATIONS

European Office Action dated Jan. 28, 2015 for European patent application No. 10843395.4, a counterpart foreign application of U.S. Appl. No. 13/059,489, 7 pages.

(Continued)

*Primary Examiner* — Ashford S Hayles
(74) *Attorney, Agent, or Firm* — Van Pelt, Yi & James LLP

(57) ABSTRACT

Embodiments of the present application relate to a method for publishing merchandise information, a device for pushing information, and a computer program product for publishing merchandise information. A method for publishing merchandise information is provided. The method includes receiving a merchandise information publishing request from a user terminal, the merchandise information publishing request including page information of the merchandise information, determining an image and a first link for a merchandise corresponding to the page information based on the page information, relating the image and the first link for the merchandise, relating a second link of the merchandise to the first link of the merchandise, and publishing the determined image and the first link for the merchandise.

8 Claims, 5 Drawing Sheets

(56) References Cited

U.S. PATENT DOCUMENTS

| | | | |
|---|---|---|---|
| 7,085,736 B2 | 8/2006 | Keezer et al. | |
| 7,165,041 B1 | 1/2007 | Guheen et al. | |
| 7,177,818 B2 | 2/2007 | Nair | |
| 7,222,090 B2 | 5/2007 | Oddo | |
| 7,797,241 B2 | 9/2010 | Colson et al. | |
| 7,805,337 B1* | 9/2010 | Ogg | G06F 17/30873 705/26.1 |
| 7,912,755 B2 | 3/2011 | Perry et al. | |
| 7,975,019 B1* | 7/2011 | Green | G06Q 30/0241 705/14.4 |
| 7,979,459 B2* | 7/2011 | Wu | G06Q 30/02 705/1.1 |
| 8,121,902 B1* | 2/2012 | Desjardins | G06Q 30/0601 705/26.1 |
| 8,429,232 B1 | 4/2013 | Appenzeller et al. | |
| 8,639,036 B1* | 1/2014 | Singer | G06K 9/6217 382/141 |
| 8,688,534 B2* | 4/2014 | Kubicki | G06F 17/30887 705/26.1 |
| 8,738,630 B2 | 5/2014 | Lin | |
| 8,924,838 B2 | 12/2014 | Spivack et al. | |
| 9,043,232 B1* | 5/2015 | Varadarajan | G06Q 30/0623 382/190 |
| 9,141,985 B1* | 9/2015 | Wiebe | G06Q 30/0613 |
| 2002/0071677 A1 | 6/2002 | Sumanaweera | |
| 2002/0077930 A1 | 6/2002 | Trubey et al. | |
| 2002/0128898 A1* | 9/2002 | Smith, Jr. | G06Q 10/06 705/7.32 |
| 2002/0143659 A1* | 10/2002 | Keezer | G06F 17/3089 705/27.1 |
| 2002/0161745 A1* | 10/2002 | Call | A61L 2/10 |
| 2003/0013951 A1 | 1/2003 | Stefanescu et al. | |
| 2003/0115116 A1* | 6/2003 | Crampton | G06F 17/3089 705/27.1 |
| 2003/0161499 A1* | 8/2003 | Svendsen | H04N 1/00244 382/102 |
| 2003/0167213 A1* | 9/2003 | Jammes | G06F 17/3089 705/26.62 |
| 2004/0143600 A1* | 7/2004 | Musgrove | G06F 17/30864 |
| 2004/0199430 A1* | 10/2004 | Hsieh | G06Q 30/02 705/26.62 |
| 2004/0208482 A1 | 10/2004 | Suga et al. | |
| 2004/0215721 A1 | 10/2004 | Szeto et al. | |
| 2005/0010486 A1* | 1/2005 | Pandhe | G06Q 30/02 705/26.8 |
| 2005/0010553 A1 | 1/2005 | Liu et al. | |
| 2005/0010602 A1 | 1/2005 | Loui et al. | |
| 2005/0050150 A1 | 3/2005 | Dinkin | |
| 2005/0097107 A1 | 5/2005 | Burt | |
| 2005/0105712 A1 | 5/2005 | Williams | |
| 2005/0160002 A1 | 7/2005 | Roetter et al. | |
| 2005/0177785 A1 | 8/2005 | Shrader et al. | |
| 2005/0234801 A1* | 10/2005 | Zhang | G06Q 30/0601 705/37 |
| 2005/0246341 A1* | 11/2005 | Vuattoux | G06Q 10/10 |
| 2005/0273420 A1* | 12/2005 | Subramanian | G06Q 30/0633 705/37 |
| 2005/0274807 A1* | 12/2005 | Barrus | G06F 17/30011 235/462.25 |
| 2006/0031193 A1 | 2/2006 | Pyun et al. | |
| 2006/0031314 A1 | 2/2006 | Brahms et al. | |
| 2006/0041560 A1 | 2/2006 | Forman et al. | |
| 2006/0041564 A1* | 2/2006 | Jain | G06F 17/30244 |
| 2006/0053364 A1* | 3/2006 | Hollander | G06F 17/241 715/232 |
| 2006/0059225 A1 | 3/2006 | Stonehocker et al. | |
| 2006/0107297 A1 | 5/2006 | Toyama et al. | |
| 2006/0143558 A1 | 6/2006 | Albornoz et al. | |
| 2006/0167876 A1 | 7/2006 | Benitez et al. | |
| 2006/0190350 A1* | 8/2006 | Maas | G06Q 30/00 705/26.62 |
| 2006/0206393 A1 | 9/2006 | Brown et al. | |
| 2006/0212361 A1 | 9/2006 | Perkowski | |
| 2006/0230064 A1 | 10/2006 | Perkowski | |
| 2006/0294085 A1 | 12/2006 | Rose et al. | |
| 2007/0073592 A1* | 3/2007 | Perry | G06Q 30/0601 705/26.1 |
| 2007/0078850 A1* | 4/2007 | Aziz | G06Q 30/0603 |
| 2007/0092142 A1 | 4/2007 | Kuriathungal et al. | |
| 2007/0112761 A1 | 5/2007 | Xu et al. | |
| 2007/0150802 A1* | 6/2007 | Wan | G06F 17/241 715/205 |
| 2007/0215685 A1* | 9/2007 | Self | G06Q 30/06 235/375 |
| 2007/0219858 A1 | 9/2007 | Seymour et al. | |
| 2007/0219958 A1 | 9/2007 | Park | |
| 2007/0233556 A1* | 10/2007 | Koningstein | G06Q 30/02 705/14.42 |
| 2007/0234217 A1 | 10/2007 | Miller et al. | |
| 2007/0250901 A1 | 10/2007 | McIntire et al. | |
| 2007/0265934 A1* | 11/2007 | Hassman | G06Q 30/06 705/26.41 |
| 2007/0271226 A1 | 11/2007 | Zhang et al. | |
| 2007/0271249 A1 | 11/2007 | Cragun et al. | |
| 2007/0282907 A1 | 12/2007 | Chambers | |
| 2007/0288453 A1 | 12/2007 | Podilchuk | |
| 2008/0028313 A1* | 1/2008 | Ebert | G06Q 30/02 712/730 |
| 2008/0033776 A1* | 2/2008 | Marchese | G06Q 20/10 705/7.33 |
| 2008/0052372 A1 | 2/2008 | Weber et al. | |
| 2008/0056538 A1 | 3/2008 | Frank | |
| 2008/0092051 A1 | 4/2008 | Sidon et al. | |
| 2008/0098300 A1 | 4/2008 | Corrales et al. | |
| 2008/0136838 A1 | 6/2008 | Goede et al. | |
| 2008/0140502 A1* | 6/2008 | Birnholz | G06Q 30/02 705/14.72 |
| 2008/0141128 A1 | 6/2008 | Takahashi et al. | |
| 2008/0154738 A1* | 6/2008 | Jain | G06Q 30/00 705/14.73 |
| 2008/0195629 A1 | 8/2008 | Kim et al. | |
| 2008/0195931 A1 | 8/2008 | Raghupathy et al. | |
| 2008/0201368 A1* | 8/2008 | Lee | G06F 17/3089 |
| 2008/0201734 A1 | 8/2008 | Lyon et al. | |
| 2008/0215456 A1 | 9/2008 | West et al. | |
| 2008/0228595 A1* | 9/2008 | Hill | G06Q 30/0603 705/26.41 |
| 2008/0249891 A1 | 10/2008 | Gura | |
| 2008/0262960 A1 | 10/2008 | Malone et al. | |
| 2008/0288454 A1 | 11/2008 | Swadi et al. | |
| 2008/0288509 A1* | 11/2008 | Mysen | G06F 17/30864 |
| 2009/0024577 A1 | 1/2009 | Pestel et al. | |
| 2009/0027418 A1 | 1/2009 | Maru et al. | |
| 2009/0031203 A1* | 1/2009 | Chandra | G06F 17/30882 715/205 |
| 2009/0049156 A1 | 2/2009 | Aronsson et al. | |
| 2009/0063455 A1 | 3/2009 | Li et al. | |
| 2009/0076800 A1 | 3/2009 | Li et al. | |
| 2009/0106234 A1* | 4/2009 | Siedlecki | G06F 17/30864 |
| 2009/0108057 A1 | 4/2009 | Mu et al. | |
| 2009/0171751 A1* | 7/2009 | Zhou | G06Q 30/02 705/14.53 |
| 2009/0171918 A1 | 7/2009 | Manber et al. | |
| 2009/0175532 A1 | 7/2009 | Zuev et al. | |
| 2009/0187459 A1* | 7/2009 | Hayes, Jr. | G06Q 30/02 705/14.51 |
| 2009/0204608 A1* | 8/2009 | Musgrove | G06Q 30/02 |
| 2009/0222550 A1 | 9/2009 | McAfee et al. | |
| 2009/0232417 A1 | 9/2009 | McMahan | |
| 2009/0240668 A1 | 9/2009 | Li | |
| 2009/0240735 A1* | 9/2009 | Grandhi | G06Q 30/02 |
| 2009/0248665 A1* | 10/2009 | Garg | G06F 17/30654 |
| 2009/0248742 A1* | 10/2009 | Krishnamurthy | G06F 17/30879 |
| 2009/0259547 A1 | 10/2009 | Clopp | |
| 2009/0282327 A1 | 11/2009 | Hamilton, II et al. | |
| 2009/0307081 A1* | 12/2009 | Rabbitt | G06Q 30/02 705/14.42 |
| 2009/0319570 A1* | 12/2009 | Subramanian | G06F 17/30244 |
| 2010/0107093 A1 | 4/2010 | Perkowski | |
| 2010/0121735 A1 | 5/2010 | Shimooka | |
| 2010/0131455 A1 | 5/2010 | Logan et al. | |

(56) References Cited

U.S. PATENT DOCUMENTS

| | | | |
|---|---|---|---|
| 2010/0211461 A1 | 8/2010 | Choi et al. | |
| 2010/0235402 A1 | 9/2010 | Han et al. | |
| 2010/0241650 A1* | 9/2010 | Chittar | G06F 17/30259 707/769 |
| 2010/0306040 A1* | 12/2010 | Arumugam | G06Q 30/02 705/14.16 |
| 2011/0099085 A1* | 4/2011 | Hamilton | G06Q 10/00 705/26.41 |
| 2011/0106851 A1* | 5/2011 | Swartz | G06Q 30/0603 707/780 |
| 2011/0145713 A1* | 6/2011 | Williams | G06Q 30/0603 715/738 |
| 2011/0184814 A1* | 7/2011 | Konkol | G06Q 30/02 705/14.69 |
| 2011/0191211 A1 | 8/2011 | Lin | |
| 2011/0264561 A1* | 10/2011 | Sundaresan | G06F 17/30678 705/27.1 |
| 2011/0320284 A1* | 12/2011 | Tennenholtz | G06Q 30/02 705/14.69 |
| 2012/0059723 A1 | 3/2012 | Wiesinger et al. | |
| 2012/0066340 A1 | 3/2012 | Armstrong et al. | |
| 2012/0095828 A1* | 4/2012 | Evankovich | G06Q 10/00 705/14.49 |
| 2012/0150598 A1* | 6/2012 | Griggs | G06Q 30/0214 705/14.16 |
| 2012/0158473 A1* | 6/2012 | Cox | G06Q 30/0209 705/14.12 |
| 2012/0207389 A1* | 8/2012 | Ghatare | G06F 17/30253 382/173 |
| 2012/0221449 A1* | 8/2012 | Kief | G06F 17/2241 705/34 |
| 2012/0271875 A1 | 10/2012 | Cai | |
| 2012/0316936 A1* | 12/2012 | Jacobs | G06Q 30/02 705/14.16 |
| 2013/0024268 A1* | 1/2013 | Manickavelu | G06Q 30/0207 705/14.39 |
| 2013/0073473 A1* | 3/2013 | Heath | G06Q 30/02 705/319 |
| 2013/0132190 A1* | 5/2013 | Lagle Ruiz | G06Q 30/0241 705/14.49 |
| 2013/0138510 A1* | 5/2013 | Carnevali | G06Q 30/0261 705/14.58 |
| 2013/0197990 A1* | 8/2013 | Velkoski | G06Q 30/02 705/14.36 |
| 2013/0198183 A1 | 8/2013 | Clendinning et al. | |
| 2013/0226711 A1* | 8/2013 | Wu | G06Q 30/02 705/14.69 |
| 2013/0268479 A1* | 10/2013 | Andler | G06F 17/30563 707/602 |
| 2013/0325600 A1* | 12/2013 | Everingham | G06Q 30/02 705/14.49 |
| 2013/0332460 A1* | 12/2013 | Pappas | G06F 17/30705 707/740 |
| 2013/0346172 A1* | 12/2013 | Wu | G06Q 30/0214 705/14.16 |
| 2014/0012693 A1* | 1/2014 | Sundaresan | G06Q 30/0283 705/26.1 |
| 2014/0019266 A1* | 1/2014 | Stoliartchouk | G06Q 30/02 705/14.73 |
| 2014/0129668 A1* | 5/2014 | Greenzeiger | H04L 41/5093 709/217 |
| 2014/0156391 A1* | 6/2014 | Neri | G06Q 30/0251 705/14.49 |
| 2014/0164093 A1* | 6/2014 | Libman | G06Q 30/0277 705/14.39 |
| 2014/0181709 A1* | 6/2014 | Rainisto | G06F 3/0481 715/765 |
| 2014/0214792 A1* | 7/2014 | Lin | G06F 17/30265 707/711 |
| 2015/0154689 A1* | 6/2015 | Fitzpatrick | G06Q 30/06 705/27.1 |
| 2015/0262255 A1* | 9/2015 | Khajehnouri | G06Q 30/0275 705/14.66 |

FOREIGN PATENT DOCUMENTS

| | | | | |
|---|---|---|---|---|
| CN | 101414307 A | * | 4/2009 | G06F 17/30265 |
| CN | 101741999 | | 6/2010 | |
| CN | 102655515 | | 9/2012 | |
| CN | 102662950 | | 9/2012 | |
| JP | H1125020 | | 1/1999 | |
| JP | 2000048027 | | 2/2000 | |
| JP | 2003067147 | | 3/2003 | |
| JP | 2003122757 | | 4/2003 | |
| JP | 2003256428 | | 9/2003 | |
| JP | 2004246454 | | 9/2004 | |
| JP | 2004348399 | | 12/2004 | |
| JP | 2005327157 | | 11/2005 | |
| JP | 2006108913 | | 4/2006 | |
| JP | 2007087409 | | 4/2007 | |
| JP | 2008219091 | | 9/2008 | |
| JP | 2010020585 | | 1/2010 | |
| KR | 20060041564 A | * | 5/2006 | |
| KR | 20060053364 A | * | 5/2006 | |
| SG | WO 2016137390 A1 | * | 9/2016 | G06F 17/30247 |
| TW | 470897 | | 1/2002 | |
| TW | I292104 | | 1/2008 | |
| TW | 201019142 | | 5/2010 | |
| WO | 0102984 | | 1/2001 | |
| WO | 2010040308 | | 4/2010 | |
| WO | WO-2016137390 A1 | * | 9/2016 | G06F 17/30247 |

OTHER PUBLICATIONS

Translated Japanese Office Action dated Mar. 24, 2015 for Japanese patent application No. 2012-548934, a counterpart foreign application of U.S. Appl. No. 13/059,489, 6 pages.

Translated Japanese Office Action dated Sep. 24, 2014 for Japanese patent application No. 2012-548934, a counterpart foreign application of U.S. Appl. No. 13/059,489, 6 pages.

EP Office Action dated Mar. 25, 2014 for European patent application No. 10843395.4, a counterpart foreign application of the U.S. Appl. No. 13/059,489, 6 pages.

Extended European Search Report dated Jul. 24, 2013 for European patent application No. 10843395.4, 8 pages.

Hrvoje, "Wget Manual", internet citation, May 14, 1997, retrieved from the internet on Apr. 8, 2002 at http://www.gnu.org/manual/wget/, 30 pgs.

Translated Japanese Office Action dated Jun. 17, 2014 for Japanese patent application No. 2011-538621, a counterpart foreign application of U.S. Appl. No. 12/663,743, 4 pages.

Bottini, et al., "Storing and Retrieving Multimedia Web Notes," In: "Field Programmable Logic and Application", Jan. 1, 2005, Berlin, Hiedelbert, vol. 3433, pp. 119-137.

Chinese Office Action dated Apr. 8, 2011 for Chinese patent application No. 200810173071.6, a counterpart foreign application of U.S. Appl. No. 12/663,743, 15 pages.

Chinese Office Action dated Aug. 23, 2010 for Chinese patent application No. 200810173071.6, a counterpart foreign application of U.S. Appl. No. 12/663,743, 9 pages.

Chinese Office Action dated Sep. 6, 2011 for Chinese patent application No. 200810173071.6, a counterpart foreign application of U.S. Appl. No. 12/663,743, 16 pages.

Extended European Search Report dated Nov. 27, 2012 for European patent application No. 09829705.4, 8 pages.

Translated Japanese Office Action dated Dec. 10, 2013 for Japanese patent application No. 2011-538621, a counterpart foreign application of U.S. Appl. No. 12/663,743, 9 pages.

Non-Final Office Action for U.S. Appl. No. 12/663,743, dated Mar. 1, 2013, Xuanyin Lin, "Image sEarch Apparatus and Methods Thereof", 62 pages.

Non-Final Office Action for U.S. Appl. No. 12/663,743, dated Apr. 12, 2012, Xuanyin Lin, "Image Search Apparatus and Methods Thereof", 14 pages.

(56) References Cited

OTHER PUBLICATIONS

Final Office Action for U.S. Appl. No. 12/663,743, dated Jul. 18, 2013, Xuanyin Lin, "Image Search Apparatus and Methods Thereof", 74 pages.
Final Office Action for U.S. Appl. No. 12/663,743, dated Sep. 10, 2012, Xuanyin Lin, "Image Search Apparatus and Methods Thereof", 33 pages.
Chinese Notice of Rejection dated Apr. 12, 2012 for corresponding Chinese patent application No. 200810173071.6, a counterpart foreign application of U.S. Appl. No. 14/243,439, 18 pages.
Final Office Action for U.S. Appl. No. 14/243,439, dated May 14, 2015, Xuanyin Lin, "Image Search Apparatus and Methods Thereof", 21 pages.
Office action for U.S. Appl. No. 14/243,439, dated Jun. 1, 2016, Lin, "Image Search Apparatus and Methods Thereof", 41 pages.
Office Action for U.S. Appl. No. 14/243,439, dated Jan. 14, 2015, Xuanyin Lin, "Image Search Apparatus and Methods Thereof", 22 pages.
Office action for U.S. Appl. No. 14/243,439, dated Dec. 17, 2015, Lin, "Image Search Apparatus and Methods Thereof", 41 pages.
Translation of Chinese Office Action from corresponding Chinese Patent Application No. 2008101730716, 33 pages.
Office Action for U.S. Appl. No. 14/243,439, dated Aug. 27, 2015, Xuanyin Lin, "Image Search Apparatus and Methods Thereof", 39 pages.

\* cited by examiner

400 ively brows mation pu informatio FIG. 2 is a flow chart illustrating an embodiment of a
process for browsing merchandise information.

FIG. 3 is a structural diagram illustrating an embodiment
of a device for publishing merchandise information.

FIG. 4 is a structural diagram illustrating an embodiment
of a device for browsing merchandise information.

FIG. 5 is a structural diagram illustrating an embodiment
of a system for publishing and browsing merchandise information.

METHOD, DEVICE AND SYSTEM FOR PUBLISHING MERCHANDISE INFORMATION

CROSS REFERENCE TO OTHER APPLICATIONS

This application claims priority to People's Republic of China Patent Application No. 201310035032.0 entitled A METHOD, DEVICE AND SYSTEM FOR PUBLISHING AND BROWSING MERCHANDISE INFORMATION, filed Jan. 30, 2013 which is incorporated herein by reference for all purposes.

FIELD OF THE INVENTION

The present application relates to a method, device and system for publishing merchandise information.

BACKGROUND OF THE INVENTION

As social networking services (SNS) and e-commerce technologies continue to develop, various social network e-commerce websites have arisen. Accordingly, an ever-increasing number of network promoting users exist. A "network promoting user" refers to a user who uses promotional links to share or promote merchandise information about merchandise displayed by various seller-users on e-commerce websites. Friends and followers of the network promoting user, as well as other buyer-users, can use the promotional links that the network promoting user provides to acquire corresponding shared or promoted detailed information on the merchandise of seller-users to learn about or purchase the merchandise of the seller-users corresponding to the promotional links.

Currently, when network promoting users promote or share merchandise information through promotional links, the network promoting users often manually acquire images and merchandise information, such as merchandise names and detailed descriptive merchandise information, from various e-commerce websites for the merchandise that they wish to promote. Typically, the network promoting users manually record the acquired merchandise images and the merchandise information corresponding to the merchandise images to publish the acquired merchandise images and the merchandise information to other e-commerce websites or network platforms where buyer-users can browse and view the acquired merchandise images and the merchandise information.

However, as the number of e-commerce websites and the quantity of merchandise on the e-commerce websites continue to increase, the steps that the network promoting users take to acquire merchandise images and merchandise information corresponding to these images have increased. Accordingly, the efforts of the network promoting users waste time and energy. The efforts greatly reduce the efficiency of collecting and publishing merchandise images and merchandise information and greatly inconvenience the network promoting users.

BRIEF DESCRIPTION OF THE DRAWINGS

Various embodiments of the invention are disclosed in the following detailed description and the accompanying drawings.

DETAILED DESCRIPTION

Figure 1:
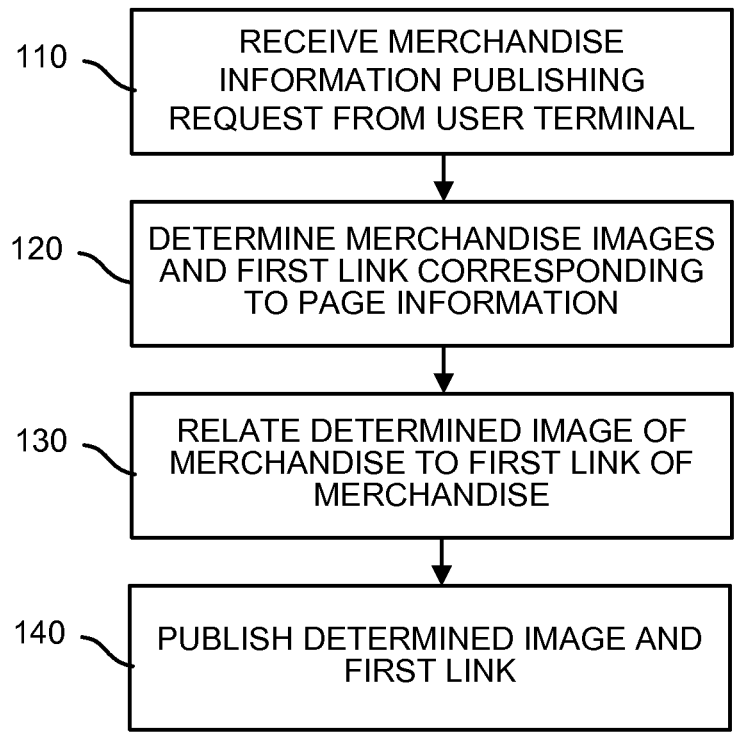
FIG. 1 is a flow chart illustrating an embodiment of a process for publishing merchandise information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Publishing and browsing merchandise information is disclosed. In some embodiments, publishing merchandise information includes: receiving a merchandise information publishing request from a user terminal, the merchandise information publishing request including page information of the merchandise information, determining images and a first link for merchandise corresponding to the page information based on the page information included in the merchandise information publishing request, relating the determined images and the first link, and publishing the related images and the first link. Browsing merchandise information includes: receiving a browsing request issued by a second user terminal for images published by a first user terminal, determining the to-be-browsed images corresponding to the browsing request and a first link for the to-be-browsed images, determining the merchandise information corresponding to the to-be-browsed images based on the first link, and sending back the determined merchandise information to the corresponding second user terminal. The present application reduces operations for publishing merchandise information and increases efficiency in collecting merchandise images and merchandise information.

FIG. 1 is a flow chart illustrating an embodiment of a process for publishing merchandise information. In some embodiments, process 100 is implemented by a server 510 of FIG. 5 and comprises:

In 110, a first server receives a merchandise information publishing request from a user terminal, the merchandise information publishing request including page information of the merchandise information.

In some embodiments, the page information of the merchandise information includes a merchandise image (e.g., a bitmap image of a book) and a merchandise first link (e.g., http://item.A.com/item.htm?id=123456 or http://item.taobao.com/item.htm?id=36895964308). The merchandise first link corresponds to an original link for merchandise. For example, the original link is an original Uniform/Universal Resource Locator (URL) or a web page address corresponding to merchandise. Furthermore, the page information of the merchandise information further includes information such as, for example, a URL for the merchandise image. In some embodiments, the first link and the original link both refer to the collected page's URL. In other words, in this case, the first link and the original link are the same link.

In some embodiments, the page information of the merchandise information corresponding to web page information is collected by a browser plugin installed in a browser, from web pages browsed by the user terminal when the user terminal is using the browser to access the web pages where various merchandise is located.

Furthermore, in some embodiments, an executable JavaScript script is pre-saved in a browser bookmark of the user terminal. Upon determining that a browsed web page includes page information to be published, such as merchandise images, the user terminal triggers the browser plugin installed within the browser. At this point, JavaScript script stored in the browser bookmark is executed, and thus the JavaScript script captures page information from the web page browsed by the user terminal.

Furthermore, in some embodiments, after the user terminal uses the browser plugin to collect page information of the merchandise information, such as merchandise images, from various websites, the collected page information of the merchandise information is sent to the first server by sending the merchandise information publishing request to the first server. Furthermore, in some embodiments, after the first server receives the page information of the merchandise information collected by the user terminal, the first server stores the received page information of the merchandise information.

In 120, the first server determines the merchandise images and a first link corresponding to the page information based on the page information included in the merchandise information publishing request. As an example, the first link and the original link both refer to the collected page's URL. In other words, the first link and the original link are the same link.

In some embodiments, after the first server determines the merchandise images and the first link corresponding to the page information, the first server extracts identity or identifier (ID) information of the merchandise from the determined first link of the merchandise or from the URL for the merchandise images, and acquires the merchandise information of the merchandise from a second server based on the extracted ID information. In some embodiments, the second server is the original server where the merchandise information of the merchandise is located.

For example, the ID information of the merchandise is text information such as numbers, letters, or a combination thereof. In some embodiments, the ID information of the merchandise uniquely identifies the merchandise information corresponding to the merchandise. In some embodiments, the ID information of the merchandise is extracted from the first link of the merchandise or from the URL of the merchandise images.

The first server determines whether the first link of the merchandise or the URL of the merchandise images contains the ID information of the merchandise based on a set URL rule (e.g., the set URL rule stipulates which fields in the URL are fields that correspond to the ID information of the merchandise). In the event that the first link of the merchandise or the URL of the merchandise images includes the ID information of the merchandise, the ID information of the merchandise is extracted from the first link of the merchandise or the URL of the merchandise images in accordance with the set URL rule.

For example, if the URL of a merchandise image corresponds to "http://item.A.com/item.htm?id=123456," the first server determines, according to a set URL rule, whether the URL of the merchandise image includes ID information for the merchandise (assuming that the set URL rule is: in the event that the URL of the merchandise image includes an "ID" or "id" field, the "ID" or "id" field indicates that the URL of the merchandise image includes ID information for the merchandise). In the event that the first link of the merchandise or the URL of the merchandise image contains the ID information of the merchandise, the first server, in accordance with the set URL rule, extracts the ID information corresponding to the merchandise from the URL corresponding to the image. For example, the first server extracts "123456" from the above URL, and regards the extracted "123456" as ID information for the merchandise.

In some embodiments, the set URL rule is to be set according to actual conditions. In one example, in link http://item.taobao.com/item.htm?id=36380801916, a value is obtained after id. In another example, in link http://item.jd.com/897033.html, the id is obtained differently.

Furthermore, in some embodiments, the first server extracts the merchandise information of the merchandise from the second server based on the extracted ID information for the merchandise. In some embodiments, the first server sends a merchandise information acquisition request to the second server, the merchandise information acquisition request including the ID information for the merchandise, receives merchandise information that relates to the ID information, the merchandise information was sent back by the second server, and regards the received merchandise information as merchandise information of the merchandise.

In some embodiments, after the first server acquires the merchandise information relating to the ID information included in the merchandise information acquisition request based on the received merchandise information acquisition request, the second server sends back the acquired merchandise information relating to the ID information through a self-provided merchandise information query interface to the first server. In other words, the first server acquires the merchandise information relating to the ID information for the merchandise through the merchandise information query interface provided by the second server. An example of the self-provided merchandise information query interface is an application programming interface (API). Websites such as taobao provide APIs for looking up products. An example of an API is taobao's open API platform (http://open.taobao.com/index.htm).

Still using the merchandise image corresponding with the URL of "http://item.A.com/item.htm?id=123456" as an example, the first server acquires the merchandise information relating to the ID information "123456" for the merchandise from the second server based on the merchandise information query interface provided by the second server and regards the acquired merchandise information as merchandise information for the merchandise.

Furthermore, in some embodiments, after the first server determines the merchandise images and the first link corresponding to the page information based on the page information, the first server determines all images in the second server that match the images of the merchandise by searching all the images in the second server and regards merchandise information corresponding to the determined images as merchandise information of the merchandise.

Furthermore, in some embodiments, after acquiring the merchandise information of the merchandise from the second server, the first server also saves the acquired merchandise information of the merchandise.

In 130, the first server relates the determined images of the merchandise to the first link of the merchandise. In other words, the first server receives a product page of the user terminal and the first link, and stores the product page and the first link together as being related.

In 140, the first server publishes the determined images and the first link. In other words, the user terminal obtains a product page and a first link, the first server stores the product page and the first link, and then outputs the content, which can be a new use or application. For example, the publication can be on a webpage, a mobile phone, etc.

In some embodiments, in the event that the first server relates and publishes the merchandise image and the merchandise first link, a second link (i.e., a promotional link for the merchandise) used at the time of publishing is set up for the merchandise, and the second link of the merchandise is related to the first link of the merchandise. In some embodiments, the first server specifies rules for transforming a first link to a second link. For example, the rules include adding a parameter and/or a value to the first link to generate a new link (the second link). Subsequently, according to the rules, the first link is transformed to the second link. In other words, the goal is to be able to trace the origin of the first link so that when the sale is made the promoting user can get fees. An example of a second link is http://item.taobao.com/item.htm?id=36895964308&pid=aHR0cDovL210ZW0u where the first link is http://item.taobao.com/item.htm?id=36895964308. In other words, the page corresponding to the first link of the merchandise is accessible through the second link of the merchandise.

As an example, when the second link (i.e., the promotional link for the merchandise) is being set for the merchandise, personal information of the network promoting user corresponding to each user terminal is used. In an example, for taobao, each network promoting user has a unique promotional user id (pid), which relates to the personal information of the user. When a product being promoted has the same pid as the user, the first server can figure out who made the promotion. For example, the pid is the promotional user's id in http://item.taobao.com/item.htm?id=36895964308&pid=aHR0cDovL210ZW0u. In other words, the promotional link set for the merchandise is to be unique for each network promoting user.

Furthermore, in some embodiments, after the first server publishes the collected merchandise images (or the merchandise images and the merchandise information of the merchandise), the buyer-user browses and views the published merchandise images (or the merchandise images and the merchandise information of the merchandise). In addition, in some embodiments, since the promotional link for the merchandise was used while publishing the merchandise images (or the merchandise images and the merchandise information of the merchandise), after the buyer-user has linked to the original page of the merchandise by clicking the displayed promotional link for the merchandise and has successfully purchased the merchandise, the network promoting user corresponding to the promotional link for the merchandise acquires an appropriate commission from the seller-user.

Furthermore, in some embodiments, after the first server publishes the collected merchandise images (or the merchandise images and/or the merchandise information of the merchandise), the first server counts the information issued by buyer-users, etc. relating to accessing the merchandise images (e.g., a frequency of visits or information on deals concluded following visits) to promptly adjust publication priority levels for the merchandise images according to a frequency of merchandise image visits or a frequency of deals concluded following visits. For example, higher publication priority levels are set for merchandise pictures with higher visit frequencies or higher post-visit closing frequencies to allow buyer-users to more quickly look up these merchandise images while the buyer-users are browsing merchandise images. In this way, merchandise image browsing efficiency is further increased.

A process for publishing merchandise information is provided. Based on web pages, the process rapidly collects merchandise images from various websites, extracts merchandise information of various merchandises in original servers corresponding to the various merchandise images, and automatically converts URLs corresponding to the merchandise images to merchandise promotional links related to the personal information of a network promoting user. Therefore, the process enables network promoting users to rapidly use the converted merchandise promotional links to carry out promotions. Thus, instead of excessive operations and low efficiency that occur when merchandise images and merchandise information are manually collected and published are reduced, and merchandise images and merchandise information are collected and published with reduced operations and increased efficiency. In addition, buyer-users can browse and view merchandise information using the merchandise images and/or merchandise information gathered together and published by a server or other network equipment. Therefore, the process increases the browsing efficiency of the merchandise information and improves merchandise information browsing experience of users.

Figure 2:
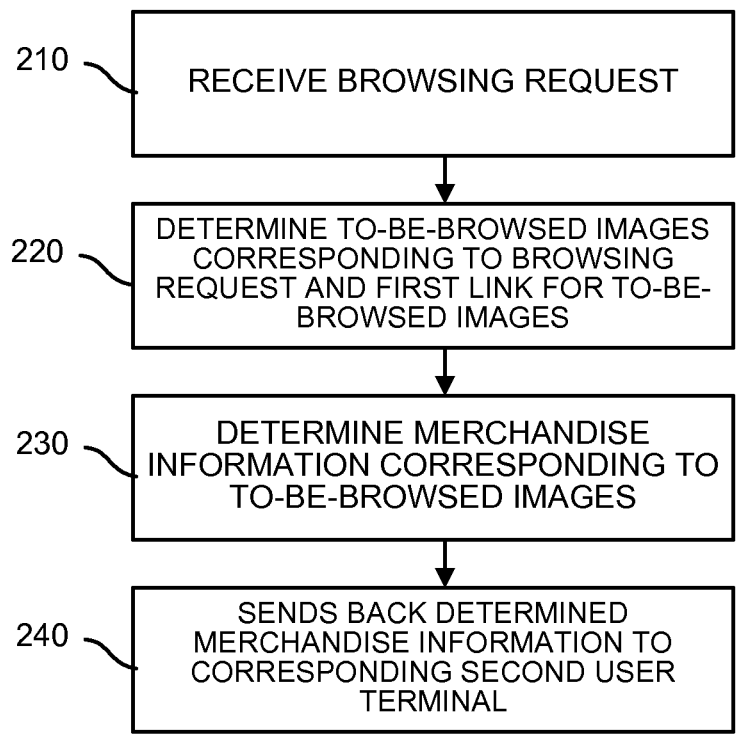

A process for browsing merchandise information is provided based on the above process for publishing merchandise information. FIG. 2 is a flow chart illustrating an embodiment of a process for browsing merchandise information. In some embodiments, the process 200 is implemented by a server 520 of FIG. 5 and comprises:

In 210, a first server receives a browsing request issued by a second user terminal for images published by a first user terminal.

In some embodiments, the browsing request includes a second link and other information of merchandise corresponding to the to-be-browsed images. Examples of the other information of merchandise include product name, product price, etc.

Furthermore, in some embodiments, the second user terminal sends the browsing request for the images published by the first user terminal to the first server by directly clicking to-be-browsed images among the images published by the first server or by clicking a second link of merchandise corresponding to the to-be-browsed images.

In 220, the first server determines to-be-browsed images corresponding to the browsing request and a first link for the to-be-browsed images.

In some embodiments, after receiving the browsing request from the second user terminal, the first server determines the to-be-browsed images corresponding to the browsing request and the first link for the to-be-browsed images based on the browsing request (e.g., a merchandise second link is included in the browsing request). In some embodiments, because the first server stored browsing requests from first users and corresponding merchandise images, the first server is able to determine the to-be-browsed images corresponding to the browsing request from the second user.

In 230, the first server determines the merchandise information corresponding to the to-be-browsed images based on the first link.

In 240, the first server sends back the determined merchandise information to the corresponding second user terminal.

In some embodiments, the first server links to an original page where the to-be-browsed images corresponding to the first link are located based on the determined first link and acquires from the original page the merchandise information of the merchandise corresponding to the to-be browsed images. In addition, the first server sends the acquired merchandise information back to the corresponding second user terminal.

Furthermore, in some embodiments, the first server counts browsing information related to images published by the first user terminal within a set length of time, and determines priority levels of the images published by the first user terminal based on the counted browsing information.

For example, the browsing information relating to visit frequency (browsing frequency) and/or other such information relating to the images published by the first user terminal is counted for a set length of time. Accordingly, the publication priority levels of the images can be promptly adjusted according to the visit frequency and/or the other such information for the published images. For example, higher publication priority levels are set for images with higher visit frequencies to allow the second user terminal to more quickly look up the images while the second user terminal is browsing merchandise images. In this way, image browsing efficiency is increased.

In process 200, the first server or other network equipment determines the to-be-browsed images corresponding to the image browsing requests based on the image browsing requests received from user terminals and the first links corresponding to the to-be-browsed images. Moreover, the merchandise information corresponding to the to-be-browsed images is determined based on the first links, and the determined merchandise information is sent back to the corresponding user terminal. Therefore, the process can increase the browsing efficiency of the merchandise information and improve the merchandise information browsing experience of users.

Figure 3:
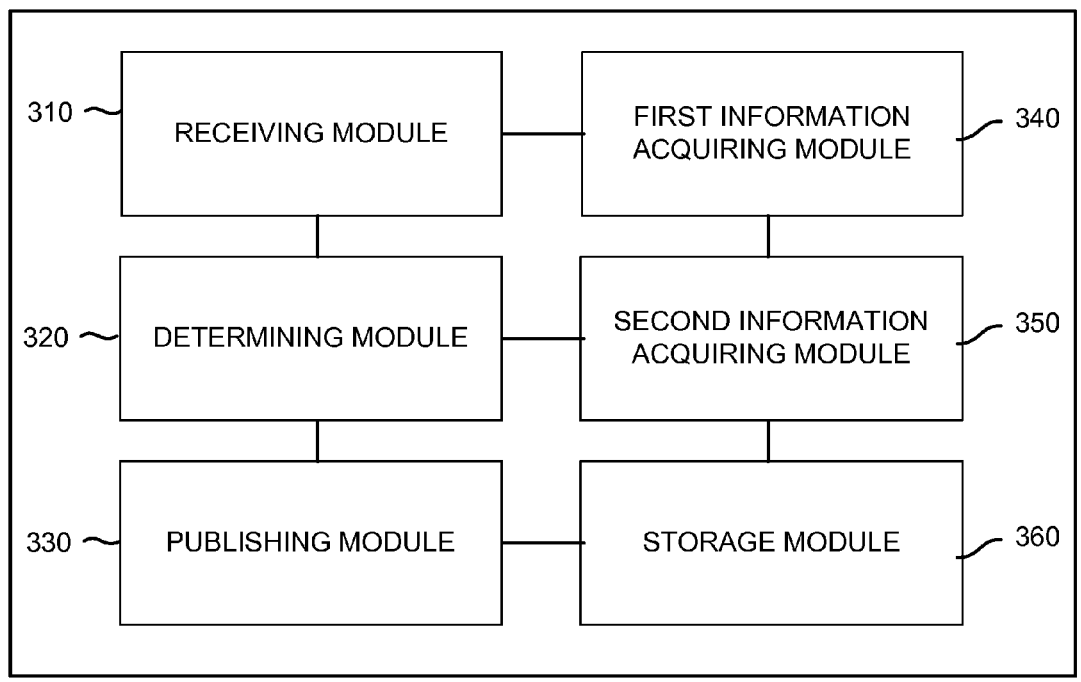

FIG. 3 is a structural diagram illustrating an embodiment of a device for publishing merchandise information. In some embodiments, the device for publishing merchandise information is a server, a network platform, or other such equipment. In some embodiments, the device 300 corresponds to the server 510 of FIG. 5 and includes a receiving module 310, a determining module 320, and a publishing module 330.

The receiving module 310 receives merchandise information publishing requests from user terminals, the merchandise information publishing requests including page information of the merchandise information.

In some embodiments, the page information of the merchandise information includes page information collected from web pages currently browsed by the user terminal using a browser plugin installed within a browser while a user terminal is using the browser to access the web pages where various merchandise is located. A first link for the merchandise corresponds to an original link of the merchandise. In other words, the first link corresponds to an original URL corresponding to the merchandise. Furthermore, in some embodiments, the page information of the merchandise information also includes a URL of a merchandise image and other information of the merchandise. The other information of the merchandise includes product names, product prices, etc.

The determining module 320 determines merchandise images and first links corresponding to the page information based on the page information of the merchandise information included in the merchandise information publishing request.

The publishing module 330 relates the determined images and the first links, and publishes the determined images and the related first links.

Furthermore, in some embodiments, the publishing module 330 sets up a second link for the merchandise (i.e., a promotional link for the merchandise) used at the time of publishing and relates the second link of the merchandise to the first link of the merchandise. In some embodiments, when the second link is set up for the merchandise, personal information of a network promoting user corresponding to each user terminal is used. In other words, the promotional link set for the merchandise is unique for each network promoting user.

Furthermore, in some embodiments, the device 300 further includes a first information acquiring module 340.

The first information acquiring module 340 extracts merchandise ID information from the determined merchandise first links or URLs of the merchandise images and acquires merchandise information of merchandise from a second server based on the extracted merchandise ID information. In some embodiments, the merchandise ID information is text information including numbers, letters, or a combination thereof. In some embodiments, the first information acquiring module 340 uniquely identifies the merchandise information corresponding to the merchandise.

In some embodiments, the first information acquiring module 340 extracts the merchandise ID information from the merchandise first links or the URLs of the merchandise images in the manner below:

In some embodiments, the first information acquiring module 340 determines whether the merchandise first links or the URLs of the merchandise images includes the ID information of the merchandise based on a set URL rule (e.g., the set URL rule designates which fields in the URL are fields corresponding to merchandise information). In the event that the merchandise first links or the URLs of the merchandise images includes the ID information of the merchandise, the first information acquiring module 340 extracts the ID information of the merchandise from the merchandise first links or the URLs of the merchandise images based on the set URL rule. In some embodiments, the set URL rule is set according to actual conditions.

Furthermore, in some embodiments, the first information acquiring module 340 sends a merchandise information acquisition request to the second server to acquire the merchandise information of the merchandise from the second server, the merchandise information acquisition request including the merchandise ID information, receives merchandise information relating to the merchandise ID information sent back by the second server, and regards the received merchandise information as the merchandise information of the merchandise.

Furthermore, in some embodiments, the device 300 further includes a second information acquiring module 350.

The second information acquiring module 350 searches images to determine images in the second server matching the images of the merchandise and regards merchandise information corresponding to each determined image as merchandise information of the merchandise.

Furthermore, in some embodiments, the publishing module 330 also relates the determined merchandise information of the merchandise to the images and the second link of the merchandise and then publishes the related merchandise information and the second link.

Furthermore, in some embodiments, the device 300 further includes a storage module 360.

The storage module 360 stores the received page information of the merchandise information and the acquired images, the merchandise information, the first links, and the second link.

In some embodiments, the first information acquiring module 340 and the second information acquiring module 350 are implemented via the Java language.

Figure 4:
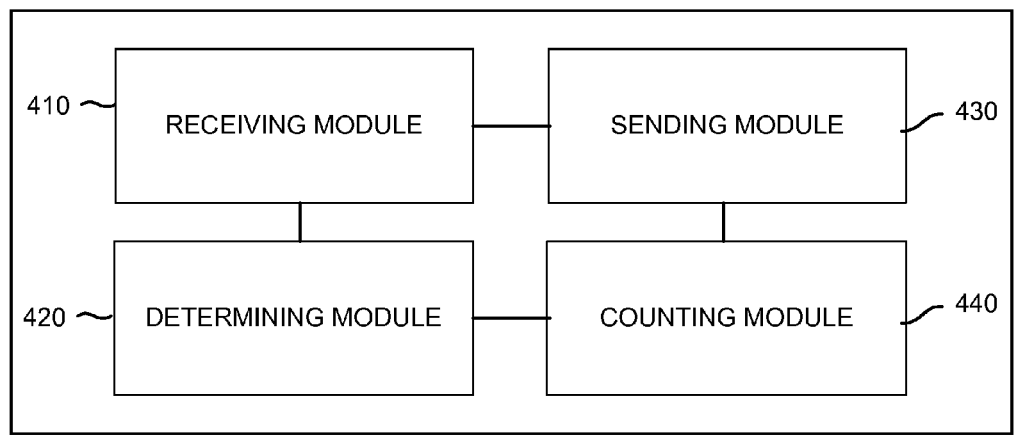

FIG. 4 is a structural diagram illustrating an embodiment of a device for browsing merchandise information. In some embodiments, the device 400 is a server, a network platform, or other such equipment. In some embodiments, the device 400 corresponds to the server 520 of FIG. 5 and includes: a receiving module 410, a determining module 420, and a sending module 430.

The receiving module 410 receives an image browsing request issued by a second user terminal for images published by a first user terminal. In some embodiments, the image browsing request includes a second link and other information of merchandise corresponding to the to-be-browsed images.

The determining module 420 determines the to-be-browsed images corresponding to the image browsing request and first links for the to-be-browsed images, and determines the merchandise information corresponding to the to-be-browsed images based on the first links. In some embodiments, the determining module 420 determines the to-be-browsed images corresponding to the image browsing request and the first links of the to-be-browsed images based on the second link included in the browsing request. Moreover, in some embodiments, the determining module 420 links to an original page where the to-be-browsed images corresponding to the first links are located based on the determined first links and acquires from the original page the merchandise information of the merchandise corresponding to the to-be browsed images.

The sending module 430 sends back the determined merchandise information to the corresponding second user terminal.

Furthermore, in some embodiments, the device 400 further includes a counting module 440.

The counting module 440 counts browsing information on images published by the first user terminal within a set length of time, and determines priority levels of the images published by the first user terminal based on the counted browsing information.

In some embodiments, the counting module 440 calculates visit frequencies (browsing frequency) and other such information relating to the images published by the first user terminal over a set length of time and then adjusts the publication priority levels of the images according to the visit frequencies for the images. For example, the higher publication priority levels are set for pictures with higher visit frequencies to more quickly look up, by the second user terminal, the images while the second user terminal is browsing merchandise images to increase picture browsing efficiency.

Figure 5:
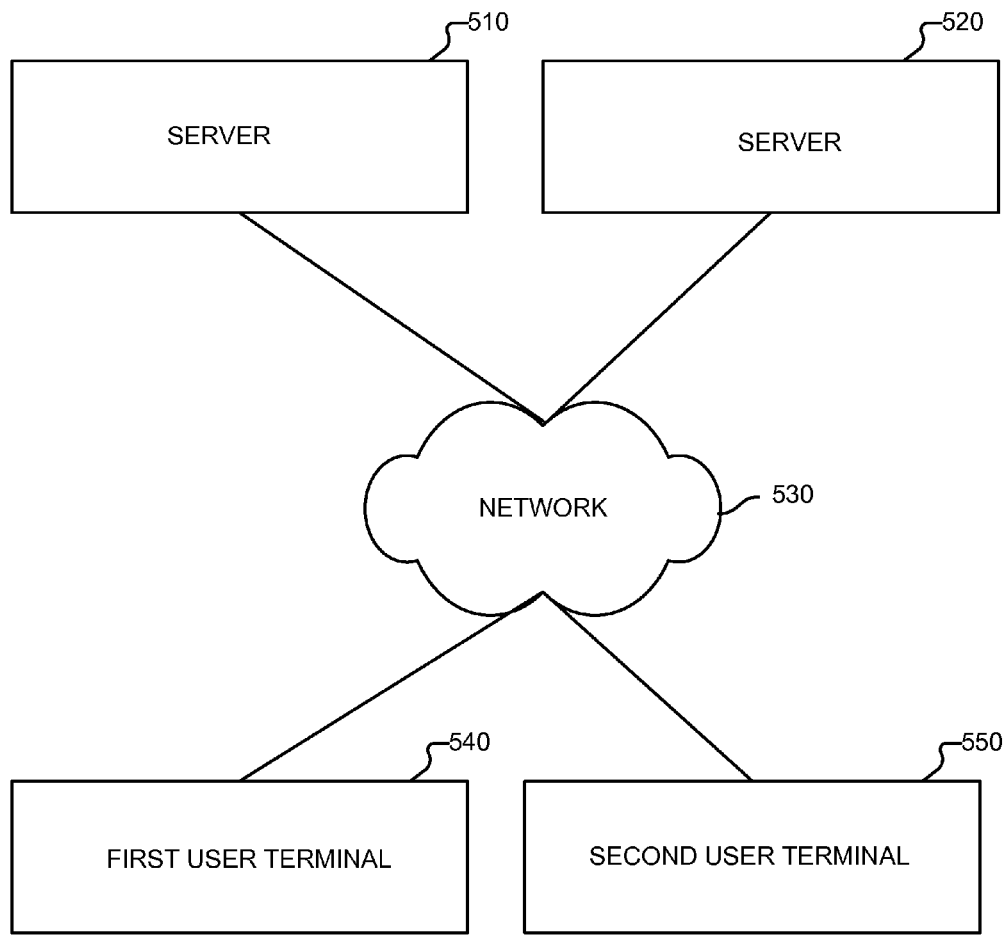

FIG. 5 is a structural diagram illustrating an embodiment of a system for publishing and browsing merchandise information. In some embodiments, the system 500 includes a server for publishing merchandise information 510 and a server for browsing merchandise information 520.

The merchandise information publishing server 510 receives merchandise information publishing requests from a first user terminal 540 via a network 530, the merchandise information publishing requests include page information of the merchandise information, determines images and first links for merchandise corresponding to the page information based on the page information, relates the determined images and the first links, and publishes the determined images and the related first links.

The merchandise information browsing server 520 receives browsing requests issued by a second user terminal 550 for images published by the first user terminal 540, determines the to-be-browsed images corresponding to the browsing requests and first links for the to-be-browsed images, determines the merchandise information corresponding to the to-be-browsed images based on the first links, and sends back the determined merchandise information to the corresponding second user terminal 550.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method for publishing merchandise information, comprising:

receiving, using a processor, a merchandise information publishing request from a user terminal, the merchandise information publishing request including page information of the merchandise information;

determining, using the processor, an image and a first link for a merchandise corresponding to the page information based on the page information, comprising:

extracting identifier (ID) information of the merchandise from the determined first link associated with the merchandise or from a Universal Resource Locator (URL) associated with the image of the merchandise;

sending the ID information of the merchandise to a server for the server to look up the image based on the ID information of the merchandise and return the found image; and receiving the found image from the server;

associating, using the processor, the image and the first link for the merchandise;

relating, using the processor, a second link of the merchandise to the first link of the merchandise based on personal information of a user corresponding to each user terminal;

publishing, using the processor, the determined image and the first link for the merchandise;

determining, using the processor, a number of visits associated with the determined image from users based on a frequency of merchandise image visits or a frequency of deals concluded following visits; and adjusting, using the processor, a priority level of the image to facilitate look up the image based on the number of visits.

2. The method for publishing merchandise information as described in claim 1, further comprising:

regarding merchandise information corresponding to the image as the merchandise information of the merchandise.

3. The method for publishing merchandise information as described in claim 1, further comprising:

relating the determined merchandise information of the merchandise to the image and the second link of the merchandise; and publishing the merchandise information and the second link.

4. A device for publishing merchandise information, comprising:

at least one processor configured to:

receive a merchandise information publishing request from a user terminal, the merchandise information publishing request including page information of the merchandise information;

determine an image and a first link for a merchandise corresponding to the page information based on the page information, comprising to:

extract identifier (ID) information of the merchandise from the determined first link associated with the merchandise or from a Universal Resource Locator (URL) associated with the image of the merchandise;

send the ID information of the merchandise to a server for the server to look up the image based on the ID information of the merchandise and return the found image; and receive the found image from the server;

associate the image and the first link for the merchandise;

relate a second link of the merchandise to the first link of the merchandise based on personal information of a user corresponding to each user terminal;

publish the determined image and the first link for the merchandise;

determine a number of visits associated with the determined image from users based on a frequency of merchandise image visits or a frequency of deals concluded following visits; and adjust a priority level of the image to facilitate look up the image based on the number of visits; and a memory coupled to the at least one processor and configured to provide the at least one processor with instructions.

5. The device for publishing merchandise information as described in claim 4, wherein the at least one processor is further configured to:

regard merchandise information corresponding to the image as the merchandise information of the merchandise.

6. The device for publishing merchandise information as described in claim 4, wherein the at least one processor is further configured to:

relate the determined merchandise information of the merchandise to the image and the second link of the merchandise; and publish the merchandise information and the second link.

7. The method for publishing merchandise information as described in claim 1, wherein the extracting of the ID information of the merchandise is based at least in part on a set of rules, the set of rules including extracting the ID information of the merchandise from an end of the determined first link or the URL, the end of the determined first link or the URL relating to a portion of the determined first link or the URL after an "ID" field or an "id" field.

8. The method for publishing merchandise information as described in claim 1, wherein the server is configured to, via a query interface, look up the image based on the ID information of the merchandise, the query interface being an application programming interface provided by the server.

* * * * *